US009440782B2

(12) United States Patent
Schall

(10) Patent No.: US 9,440,782 B2
(45) Date of Patent: Sep. 13, 2016

(54) PLANT ORGANIZING AND GROWING ASSEMBLY

(71) Applicant: Randy Schall, Sioux Falls, SD (US)

(72) Inventor: Randy Schall, Sioux Falls, SD (US)

(*) Notice: Subject to any disclaimer, the term of this patent is extended or adjusted under 35 U.S.C. 154(b) by 113 days.

(21) Appl. No.: 14/152,659

(22) Filed: Jan. 10, 2014

(65) Prior Publication Data

US 2015/0195996 A1 Jul. 16, 2015

Related U.S. Application Data

(63) Continuation-in-part of application No. 13/531,755, filed on Jun. 25, 2012, now abandoned, and a continuation-in-part of application No. 13/895,728, filed on May 16, 2013, now Pat. No. 8,950,113.

(51) Int. Cl.
| | | |
|---|---|---|
| *B65D 85/52* | (2006.01) | |
| *B65D 19/18* | (2006.01) | |
| *B65D 25/06* | (2006.01) | |
| *A01G 9/02* | (2006.01) | |

(52) U.S. Cl.
CPC ............... *B65D 85/52* (2013.01); *A01G 9/02* (2013.01); *B65D 19/18* (2013.01); *B65D 25/06* (2013.01); *B65D 2519/008* (2013.01); *B65D 2519/00034* (2013.01); *B65D 2519/00069* (2013.01); *B65D 2519/0086* (2013.01); *B65D 2519/00174* (2013.01); *B65D 2519/00273* (2013.01); *B65D 2519/00288* (2013.01); *B65D 2519/00318* (2013.01); *B65D 2519/00497* (2013.01); *B65D 2519/00562* (2013.01); *B65D 2519/00791* (2013.01); *B65D 2519/00815* (2013.01)

(58) Field of Classification Search
CPC ........ A01G 9/02; A01G 9/027; A01G 9/028; A01G 9/10; A01G 9/104
USPC .......... 47/65.5, 66.1, 66.5, 41.01, 75, 85, 86
See application file for complete search history.

(56) References Cited

U.S. PATENT DOCUMENTS

| | | | | |
|---|---|---|---|---|
| 2,423,724 | A | * | 7/1947 | Paxton .............................. 47/86 |
| 3,032,927 | A | * | 5/1962 | Kobs ................................. 47/73 |
| 3,353,704 | A | * | 11/1967 | Belcher et al. ................ 220/510 |
| 3,660,934 | A | * | 5/1972 | Pollack et al. .................... 47/84 |
| 3,752,121 | A | * | 8/1973 | Brazzell ........................ 119/169 |
| 4,014,135 | A | * | 3/1977 | Greenbaum ...................... 47/86 |
| 4,126,963 | A | * | 11/1978 | Dunbar .......................... 47/40.5 |
| 4,213,274 | A | * | 7/1980 | Skaife ............................... 47/81 |
| 4,499,997 | A | | 2/1985 | Swingley, Jr. |
| 4,635,810 | A | * | 1/1987 | Tate .............................. 220/510 |
| 4,769,946 | A | * | 9/1988 | de Groot et al. ................. 47/73 |
| 4,899,487 | A | | 2/1990 | Brownlee |
| 5,355,837 | A | * | 10/1994 | Reyes ........................... 119/161 |

(Continued)

*Primary Examiner* — David Parsley
*Assistant Examiner* — Morgan T Barlow

(57) ABSTRACT

A plant organizing and growing assembly includes a housing that has a bottom wall and a perimeter wall which is attached to and extends upwardly from the bottom wall. The perimeter wall has an inner surface and an outer surface. The perimeter wall bounds an enclosed space and the bottom wall has a generally rectangular shape. A plurality of legs is coupled to and extends downwardly from a bottom surface of the bottom wall. The legs are spaced apart and include four corner legs each positioned adjacent to one of the corners of the bottom wall. Each of the corner legs has a bottom surface having an aperture extending therein. Each of the apertures terminates before extending through the bottom wall such that the apertures are spaced from an upper surface of the bottom wall.

1 Claim, 6 Drawing Sheets

(56) References Cited

U.S. PATENT DOCUMENTS

| | | |
|---|---|---|
| 5,921,188 A | 7/1999 | Kohlhaas |
| 6,266,921 B1 * | 7/2001 | Keskilohko ................ 47/86 |
| 6,401,387 B1 * | 6/2002 | Diloreto et al. ............ 47/66.6 |
| 6,783,023 B1 | 8/2004 | Fan |
| 7,434,539 B2 * | 10/2008 | Gloor ........................ 119/165 |
| 8,776,726 B2 * | 7/2014 | Hillman ..................... 119/169 |
| 8,887,667 B2 * | 11/2014 | Maguire et al. ............ 119/166 |
| 2003/0106262 A1 * | 6/2003 | Lai ............................. 47/65.6 |
| 2006/0108368 A1 | 5/2006 | Dube et al. |

* cited by examiner

US 9,440,782 B2

PLANT ORGANIZING AND GROWING ASSEMBLY

CROSS-REFERENCE TO RELATED APPLICATIONS

This application claims benefit of U.S. patent application Ser. No. 13/531,755 filed on Jun. 25, 2012 and U.S. patent application Ser. No. 13/895,728 filed on Jun. 16, 2013 under Title 35 U.S.C. §120.

BACKGROUND OF THE DISCLOSURE

1. Field of the Disclosure

The disclosure relates to planter devices and more particularly pertains to a new planter device for holding either potted plants or for use as an above ground planter.

SUMMARY OF THE DISCLOSURE

An embodiment of the disclosure meets the needs presented above by generally comprising a housing that has a bottom wall and a perimeter wall which is attached to and extends upwardly from the bottom wall. The perimeter wall has an inner surface and an outer surface. The perimeter wall bounds an enclosed space and the bottom wall has a generally rectangular shape. A plurality of legs is coupled to and extends downwardly from a bottom surface of the bottom wall. The legs are spaced apart and include four corner legs each positioned adjacent to one of the corners of the bottom wall. Each of the corner legs has a bottom surface having an aperture extending therein. Each of the apertures terminates before extending through the bottom wall such that the apertures are spaced from an upper surface of the bottom wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
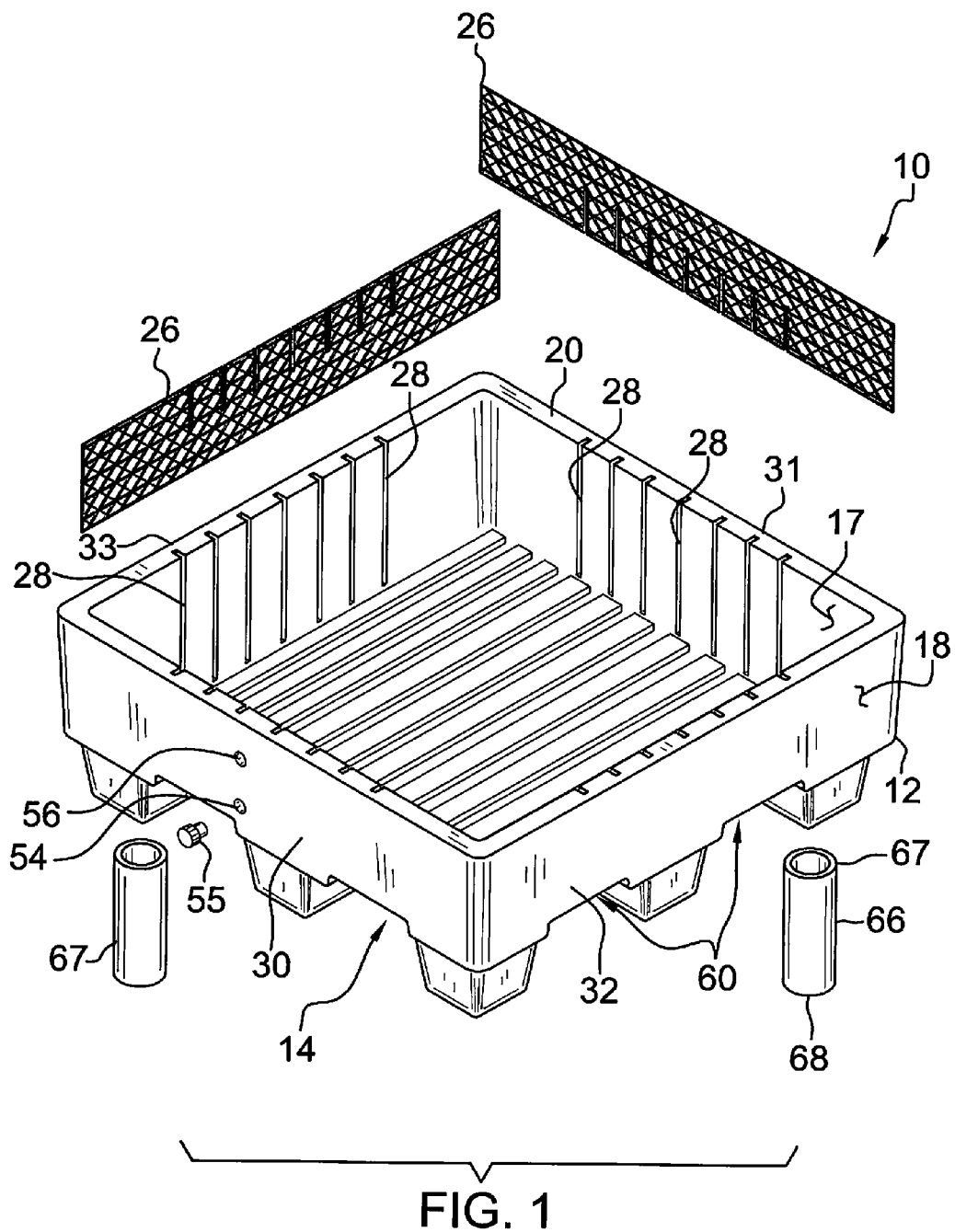
FIG. 1 is a top perspective view of a plant organizing and growing assembly according to an embodiment of the disclosure.
Figure 2:
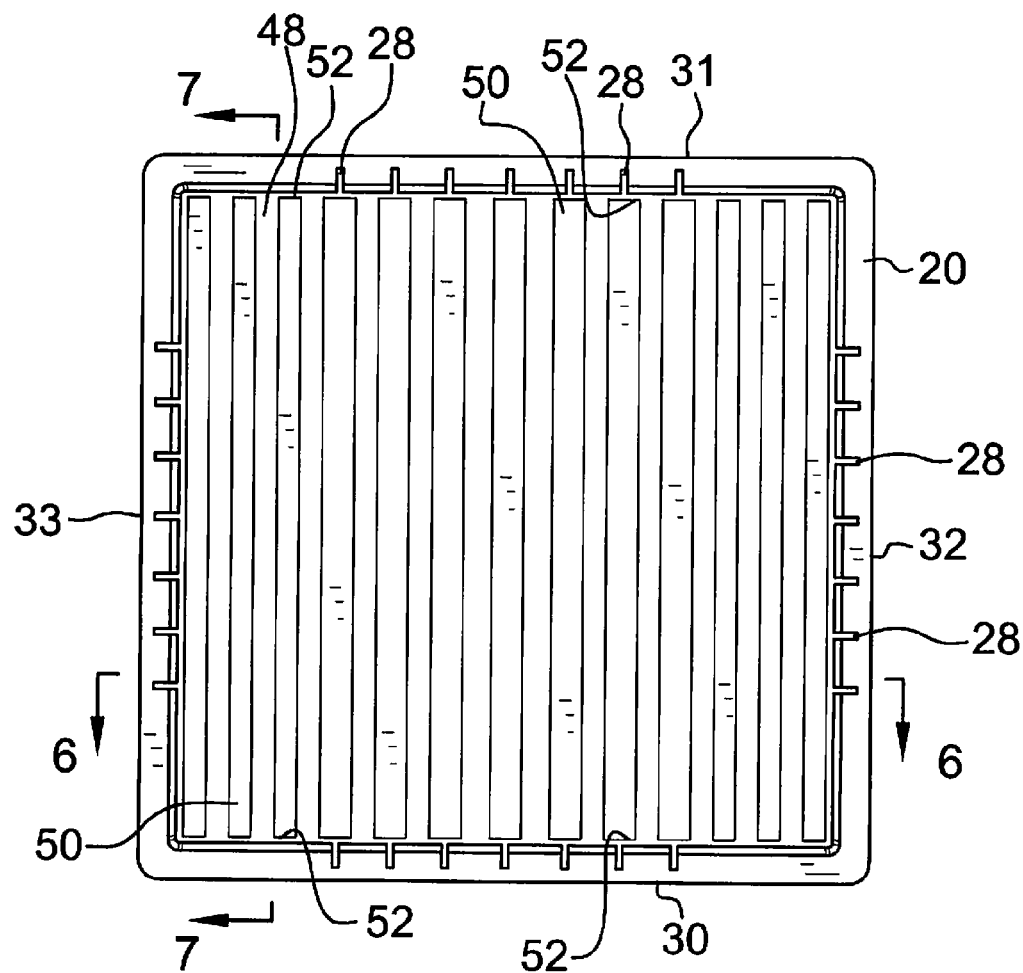
FIG. 2 is a top view of an embodiment of the disclosure.
Figure 3:
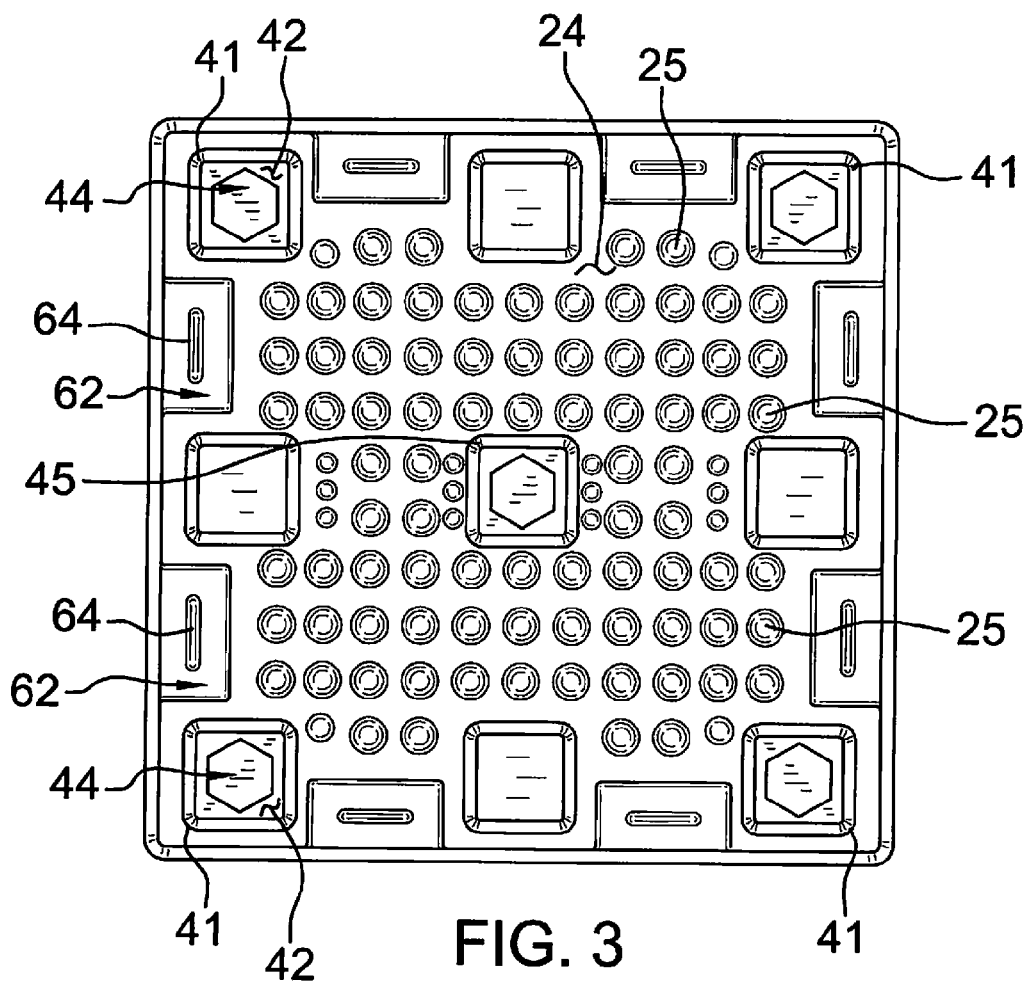
FIG. 3 is a bottom view of an embodiment of the disclosure.
Figure 4:
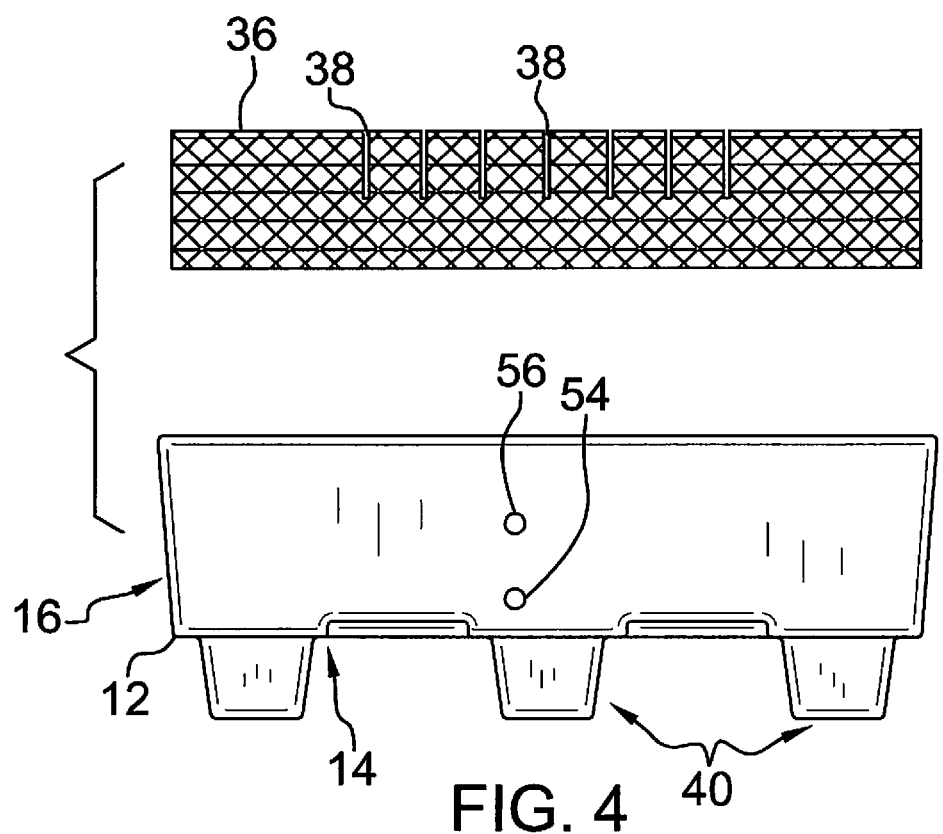
FIG. 4 is a front view of an embodiment of the disclosure.
Figure 5:
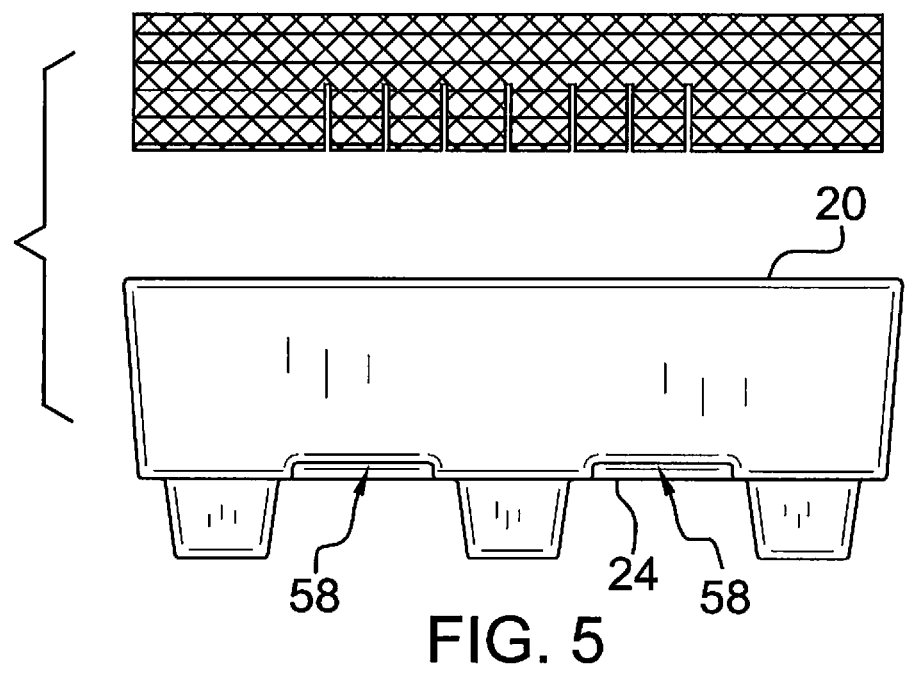
FIG. 5 is a side view of an embodiment of the disclosure.
Figure 6:
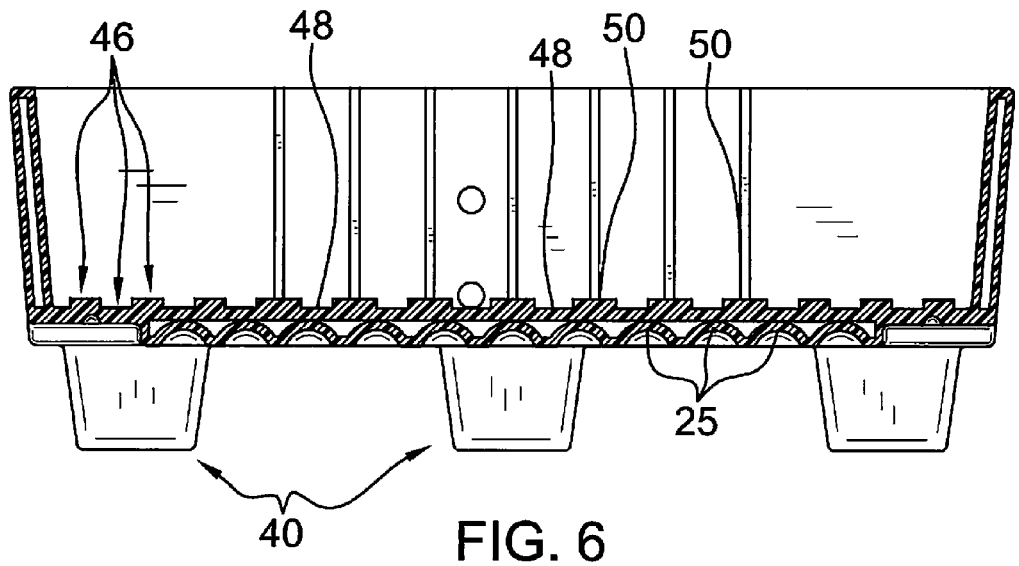
FIG. 6 is a cross-sectional view of an embodiment of the disclosure taken along line 6-6 of FIG. 2.
Figure 7:
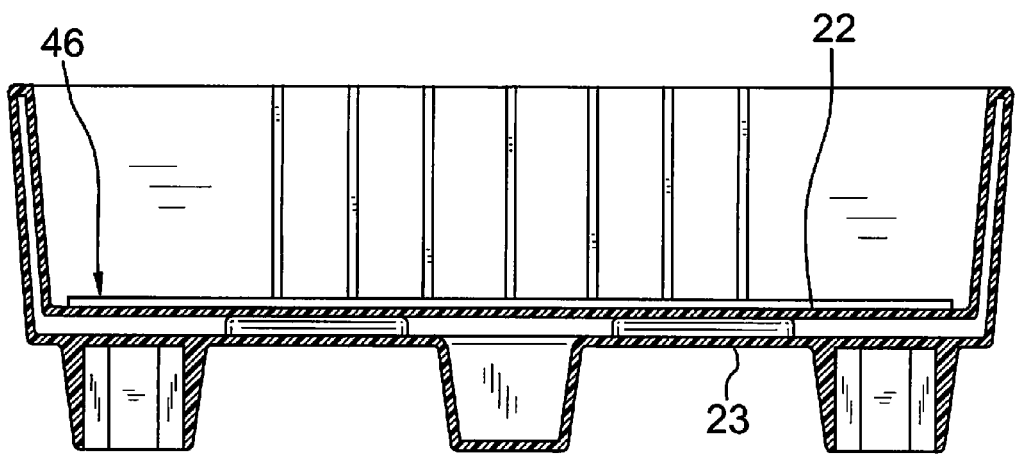
FIG. 7 is a cross-sectional view of an embodiment of the disclosure taken along line 7-7 of FIG. 2.
Figure 8:
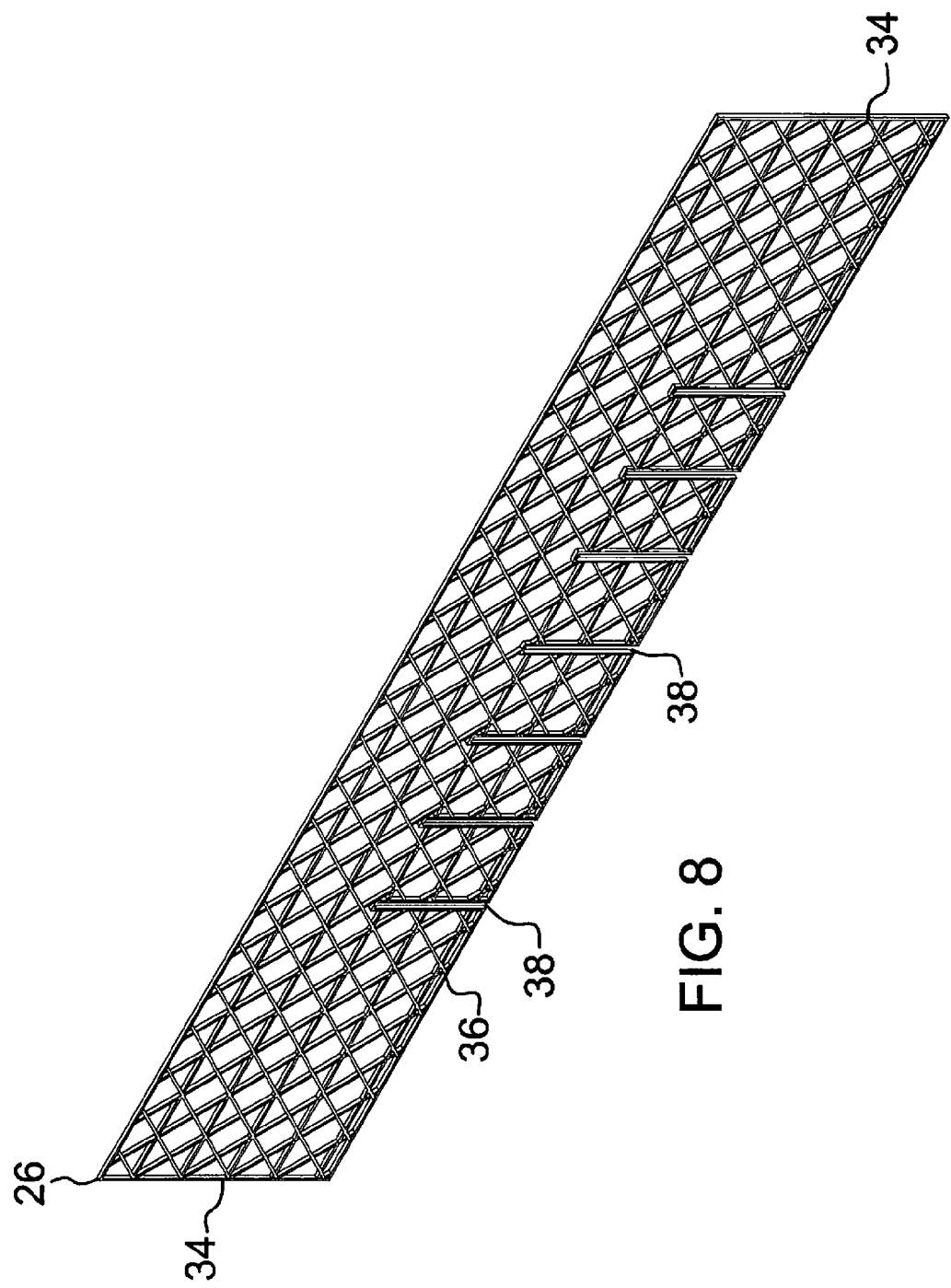
FIG. 8 is a perspective view of a slat of an embodiment of the disclosure.

With reference now to the drawings, and in particular to FIGS. 1 through 8 thereof, a new planter device embodying the principles and concepts of an embodiment of the disclosure and generally designated by the reference numeral 10 will be described.

As best illustrated in FIGS. 1 through 8, the plant organizing and growing assembly 10 generally comprises a housing 12 that has a bottom wall 14 and a perimeter 16 wall which is attached to and extends upwardly from the bottom wall 14. The perimeter wall 16 has an inner surface 17 and an outer surface 18 and the perimeter wall 16 bounds an enclosed space. The bottom wall 14 has a generally rectangular shape though it should be understood that other shapes, including round, may be utilized. The perimeter wall 16 tapers outwardly from the bottom wall 14 to an upper edge 20 of the perimeter wall 16 to allow nesting of multiple ones of the housings 12. The bottom wall 14 may be hollow and include an upper wall 22 spaced from a lower wall 23 wherein the lower wall 23 defines a bottom surface 24 of the bottom wall 14. The bottom surface 24 may have a plurality of indentations 25 therein such that portions of the lower wall 23 associated with the indentations 25 are positioned adjacent to the upper wall 22 within an open space between the upper 22 and lower 23 walls. The indentations 25 provide additional support for the upper wall 22 and inhibit the upper wall 22 from bowing downwardly when weight is placed upon the upper wall 22. This will in turn allow for even flowing of fluid within the housing 12 as is described below. The housing 12 may have a length and width each between 45.0 inches and 65.0 inches along the upper edge 20 of the perimeter wall 16. This may decrease, in each direction, by between 2.0 inches and 6.0 inches at the bottom wall 14 due to the tapering inward of the perimeter wall 16 from the upper edge 20 to the bottom wall 14. Further, the perimeter wall 16 may have a height generally between 8.0 inches and 16.0 inches.

A plurality of interlocking slats 26 is provided and is selectively positionable in the enclosed space of the perimeter wall 16. The slats 26 define a plurality of compartments in the enclosed space once the slats are positioned within the housing 12 and against the bottom wall 14. For clarity the Figures only show two slats 26 though it should be understood that the assembly 10 may include may include multiple, such as ten or more, slats to be used with the assembly 10. Each of the slats 26 may have a plurality of flow openings extending therethrough to facilitate flow of fluids through the slats. The slats 26 may be formed from a rigid webbing such that the slats include more open space than closed space to further allow freedom of fluid flow. Such a structure is further lightweight and inexpensive to produce. The slats 26 and housing 12 may be comprised of a plastic material.

A plurality of slots 28 extends into the inner surface 17 of the perimeter wall 16. The perimeter wall 16 may include four walls wherein each of the four walls has a plurality of the slots 28 therein. Each of the slots 28 is vertically oriented and extends from the bottom wall 14 and toward the upper edge 20. The slots 28 may extend through the upper edge 20. Each of the slots 28 has an associated opposing slot 28 extending into the perimeter wall 16 to define an aligned pair of the slots 28. The slots 28 may be positioned from each other between 4.0 inches and 8.0 inches from each other and further may be positioned along a length of each of a front wall 30, a rear wall 31, a first lateral wall 32 and a second lateral wall 33. The slots 28 may be equally spaced from each other or their may be variances in the distances between them such that compartments may be made having particular sizes useful to the industry of potted trees, bushes and shrubs.

Each of the slats 26 has a pair of opposed ends 34. The opposed ends 34 of each of the slats is removably positionable in a selectable one of the aligned pair of the slots 28 to retain the slats 26 in a vertical orientation. Further, each of the slats 26 has an edge 36 having a plurality of spaced slits 38 therein. Each of the slits 38 is in alignment with one of the aligned pair of slots 28 when the opposed ends 34 of the slat 26 are inserted into the aligned pair of slots 28. The slits 38 of one of the slats 26 are engaged with the slits of another of the slats when the slats are engaged with each other to form the compartments bounded by the slats and perimeter wall. The slits travel approximately ½ of a height of the slats.

A plurality of legs 40 coupled to and extends downwardly from the bottom surface 24 of the bottom wall 14. The legs 40 are spaced apart and may at least include four corner legs 41 each positioned adjacent to one of the corners of the bottom wall 14. Each of the corner legs 41 has a bottom surface 42 having an aperture 44 extending therein. Generally, the apertures 44 terminate before extending through the bottom wall 14 such that the apertures 44 are spaced from an upper surface 46 of the bottom wall 14. If the apertures 44 should extend through the bottom wall 14 they will have diameter greater than 3.5 inches. However, such would generally not be preferred for fluid retention reasons though such may be more useful for pine tree stability as described more below. Each aperture 44 may be hexagonally shaped to better engage a tree such as a pine tree when the assembly 10 is being used to display Christmas trees. The plurality of legs 40 includes a centrally located leg 45 spaced from a perimeter edge of the bottom wall 14. The centrally located leg 45 may also have one of the apertures 44 extending therein. The apertures 44 have a size such that a diameter of a cylinder positioned within the aperture 44 may have a maximum outer diameter of between 3.5 inches and 6.0 inches. The legs 40 may have a height equal to approximately 6.0 inches and generally less than 12.0 inches.

The upper surface 46 of the bottom wall 14 has a plurality of troughs 48 therein. The troughs 48 each extend between a front wall 30 and a rear wall 31 of the perimeter wall 16. The troughs 48 are divided by raised sections 50 of the bottom wall 14. The raised sections 50 may each have a pair of terminal ends 52 spaced from the perimeter wall 16 to facility fluid flow around between the raised sections 50 and the perimeter wall 16. The troughs 48 will generally have a width between 1.0 inches and 3.0 inches and a depth of 1.0 inches or less.

The front wall 30 has a drain opening 54 extending therethrough adjacent to the bottom wall 14 to allow drainage of fluid outwardly of the housing 12. A plug 55 is removably positionable in the drain opening 54. A well 56 extends into the front wall 30 and is used for receiving the plug 55 when the plug 55 is removed from the drain opening 54. The well 55 may be positioned nearer to the upper edge 20 than the bottom wall 14 and will not necessarily extend through the perimeter wall 16. The well 56, opening 54 and plug 55 may each be threaded.

The housing 12 includes a plurality of handholds 58. Each of the handholds 58 extends into a juncture of the perimeter wall 16 and the bottom wall 14 so that each of the handholds 58 includes a perimeter wall depression 60 extending into the perimeter wall 16 and a bottom wall depression 62 extending upwardly into the bottom wall 14. The bottom wall depression 62 may further include finger-holds 64 extending upwardly into the bottom wall 14. The perimeter wall 16 includes a plurality of side walls 30-33 and each of the side walls 30-33 may include two of the handholds 58. The legs 40 each has a height great enough to prevent touching of the perimeter walls 16 of two of the nested housings 12 when the housings 12 are nested to facilitate access to the handholds 58 between the perimeter walls 16 of the two housings 12. The legs 40 each have a height less than a height of the perimeter wall 16 to place the bottom wall 14 of an upper housing 12 below the upper edge 20 of the lower housing 12 when two housings 12 are nested.

A plurality of posts 66 is provided. Each of the posts 66 has a top end 67 and a bottom end 68 and each of the top ends 67 is removably extended into one of the apertures 44 such that at least four of the apertures 44 is engaged with one of the posts 66. Each of the posts 66 has a height between 12.0 inches and 48.0 inches. While only two posts 66 are shown in FIG. 1, it should be understood that typically the assembly 10 will include at least four posts 66 and more particularly at least five posts 66 such that one of the posts is placed in the aperture 44 of the central leg 45.

In use, the assembly 10 may be utilized in a number of manners. First, as a potted plant holder, the slats 26 may be positioned in the housing 12 to create a desired amount of compartments. In particular slats 26 will be positioned so that the compartments have a length and width just slightly larger than the diameter of the pot in which the plant is potted. When the potted plants are placed within the housing 12, the compartments prevent the potted plants from falling over in high wind conditions. Further, the housing 12 allows all of the potted plants to be efficiently watered by partially filling the housing with water such that the water enters the pots. This is particularly useful for those plants which require water at the base of their roots.

Second, the housing 12 may be turned upside down so that the apertures 44 can receive the trunks of pine trees. In this manner the housings 12 may be used to display Christmas trees when the housing 12 cannot be used for potted plants due to improper growing seasons.

Third, the housing 12, with or without the posts 66, may be used as a raised garden. The slats 26 may or may not be used with such but may be useful in dividing the housing 12 into easily identifiable areas within the housing 12 so that the user can easily mark which plants are located within each area of the housing 12. The housing 12, for this usage, is filled with soil and plants are planted therein in a conventional manner. The posts 66 may be used to lift the housing 12 higher off of a ground surface than the legs 40 alone to facilitate access to the plants and soil. The posts 66 may have a shape similar to the shape of the apertures 44 to better retain in them in position and prevent their rotation. Additionally, the posts 66 may have open ends to allow them to receive the trunks of the pine trees and in this manner act as an extension of the aperture 44 and leg 40. Such a usage with the trunk will further stabilize the pine tree.

The plug 55 may be used, in both the first and third methods, to retain water within the housing 12 or to allow it to drain out as needed to prevent oversaturation of the pots or soil with water. The slats 26 are constructed to ensure that water may easily and evenly flow through the housing and in and around the pots and plants located therein.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A plant displaying assembly comprising:
a housing having a bottom wall and a perimeter wall being attached to and extending upwardly from said bottom wall, said perimeter wall having an inner surface and an outer surface, said perimeter wall bounding an enclosed space, said bottom wall having a generally rectangular shape, said perimeter wall tapering outwardly from said bottom wall to an upper edge of said perimeter wall to allow nesting of multiple housings, said bottom wall being hollow and including an upper wall spaced from a lower wall wherein said lower wall defines a bottom surface of said bottom wall, said bottom surface having a plurality of indentations therein such that portions of said lower wall associated with said indentations are positioned adjacent to said upper wall within an open space between said upper and lower walls, said indentations inhibiting said upper wall from bowing downwardly when weight is placed on said upper wall;
a plurality of interlocking slats, said slats being selectively positionable in said enclosed space, said slats defining a plurality of compartments in said enclosed space, each of said slats having a plurality of flow openings extending therethrough to facilitate flow of fluids through said slats;
a plurality of slots extending into said inner surface of said perimeter wall, said perimeter wall including four walls, each of said four walls having a plurality of said slots therein, each of said slots being vertically oriented and extending from said bottom wall and toward said upper edge, wherein each of said slots has an associated opposing slot extending into said perimeter wall to define an aligned pair of said slots;
each of said slats having a pair of opposed ends, said opposed ends of each of said slats being removably positionable in a selectable one of said aligned pair of said slots to retain said slats in a vertical orientation;
each of said slats having an edge having a plurality of spaced slits therein, each of said slits being in alignment with one of said aligned pair of slots when said opposed ends of said slat are inserted into said aligned pair of slots, wherein said slits of one of said slats are engaged with said slits of another of said slats when said slats are engaged with each other;
a plurality of legs coupled to and extending downwardly from a bottom surface of said bottom wall, said legs being spaced apart, said legs including four corner legs each positioned adjacent to one of said corners of said bottom wall, each of said corner legs having a bottom surface having an aperture extending therein, each of said apertures terminating before extending through said bottom wall such that said apertures are spaced from an upper surface of said bottom wall, each aperture being hexagon shaped, said plurality of legs including a centrally located leg spaced from a perimeter edge of said bottom wall, said centrally located leg having one of said apertures extending therein;
said bottom wall having an upper surface having a plurality of troughs therein, said troughs each extending between a front wall and a rear wall of said perimeter wall, said troughs being divided by raised sections of said bottom wall, said raised sections each having a terminal end spaced from said perimeter wall to facility fluid flow around between said raised sections and said perimeter wall;
said front wall having a drain opening extending therethrough adjacent to said bottom wall, a plug being removably positionable in said drain opening;
a well extending into said front wall, said well receiving said plug when said plug is removed from said drain opening, said well being positioned nearer to said upper edge than said bottom wall;
said housing including a plurality of handholds, each of said handholds extending into a juncture of said perimeter wall and said bottom wall such that each of said handholds includes a perimeter wall depression extending into said perimeter wall and a bottom wall depression extending upwardly into said bottom wall, said perimeter wall including a plurality of side walls, each of said side walls including two of said handholds;
said legs each having a height great enough to prevent touching of said perimeter walls of two of said nested housings when said housings are nested to facilitate access to said handholds, said legs each having a height less than a height of said perimeter wall; and
a plurality of posts, each of said posts having a top end and a bottom end, each of said top ends being removably extended into one of said apertures such that at least four of said apertures is engaged with one of said posts, each of said posts having a height between 12.0 inches and 48.0 inches.

* * * * *